United States Patent
Heim et al.

(10) Patent No.: US 11,014,273 B2
(45) Date of Patent: May 25, 2021

(54) DEVICE AND METHOD FOR PRODUCING A MOULDING OF SURFACE PROPERTIES

(71) Applicant: Technische Universität Darmstadt, Darmstadt (DE)

(72) Inventors: Lars-Oliver Heim, Bickenbach (DE); Dmytro Golovko, Groß-Zimmern (DE)

(73) Assignee: Technische Universität Darmstadt, Darmstadt (DE)

( * ) Notice: Subject to any disclaimer, the term of this patent is extended or adjusted under 35 U.S.C. 154(b) by 328 days.

(21) Appl. No.: 15/576,865

(22) PCT Filed: May 25, 2016

(86) PCT No.: PCT/EP2016/061858
§ 371 (c)(1),
(2) Date: Nov. 27, 2017

(87) PCT Pub. No.: WO2016/189064
PCT Pub. Date: Dec. 1, 2016

(65) Prior Publication Data
US 2018/0169911 A1    Jun. 21, 2018

(30) Foreign Application Priority Data

May 27, 2015 (DE) ............... 10 2015 108 327.2

(51) Int. Cl.
*B29C 43/36* (2006.01)
*G01Q 30/20* (2010.01)
(Continued)

(52) U.S. Cl.
CPC ............ *B29C 43/361* (2013.01); *B29C 43/18* (2013.01); *B29C 43/52* (2013.01); *B29C 43/58* (2013.01);
(Continued)

(58) Field of Classification Search
CPC .............................. B29C 43/361; B29C 59/02
(Continued)

(56) References Cited

U.S. PATENT DOCUMENTS 4,554,036 A * 11/1985 Newsom ................. B29C 73/30
156/285
5,640,054 A * 6/1997 McGovern .............. B29C 43/36
102/520
(Continued)

FOREIGN PATENT DOCUMENTS

JP    2008062486 A    3/2008
JP    2008279772 A    11/2008
(Continued)

OTHER PUBLICATIONS

Machine Translation JP2014124683 (Year: 2014).*

*Primary Examiner* — Matthew J Daniels
*Assistant Examiner* — Wayne K. Swier
(74) *Attorney, Agent, or Firm* — Smartpat PLC

(57) ABSTRACT

A device (1) for producing a moulding of surface properties comprises a housing (3) having a pressure plunger (4) mounted on or in the housing (3), which can be moved and can be pressed on a surface (2), which pressure plunger has a blank carrier (5) comprising a pressure surface (6) which can be pressed on the surface (2), on which pressure surface a moulding blank (7) comprising a moulding layer (9) made of a curable material can be secured in a detachable manner. The device further comprises a curing device (12) arranged on or in housing (3), with which the curable material of the moulding blank (7) can be cured while being pressed on the surface (2).

11 Claims, 5 Drawing Sheets

(51) Int. Cl.
*B29C 43/18* (2006.01)
*B29C 43/52* (2006.01)
*B29C 43/58* (2006.01)
*B29C 35/08* (2006.01)
*B29C 43/02* (2006.01)

(52) U.S. Cl.
CPC .......... G01Q 30/20 (2013.01); *B29C 35/0805* (2013.01); *B29C 43/021* (2013.01); *B29C 2035/0827* (2013.01); *B29C 2043/3615* (2013.01); *B29C 2043/3626* (2013.01); *B29C 2043/5808* (2013.01)

(58) Field of Classification Search
USPC ........................................................ 264/293
See application file for complete search history.

(56) References Cited

U.S. PATENT DOCUMENTS

| | | | |
|---|---|---|---|
| 6,435,242 B1* | 8/2002 | Reis | B29C 73/12 |
| | | | 156/382 |
| 6,849,558 B2* | 2/2005 | Schaper | B29C 33/52 |
| | | | 438/758 |
| 6,900,881 B2* | 5/2005 | Sreenivasan | B29C 35/0888 |
| | | | 257/E21.024 |
| 9,427,911 B1* | 8/2016 | Evens | B64F 5/40 |
| 9,782,937 B1* | 10/2017 | Modin | B29C 70/30 |
| 2007/0051718 A1* | 3/2007 | Schmitt | B23P 19/006 |
| | | | 219/635 |
| 2010/0072665 A1* | 3/2010 | Imai | B29C 33/02 |
| | | | 264/293 |
| 2010/0166906 A1 | 7/2010 | Hashimoto et al. | |
| 2012/0125534 A1* | 5/2012 | Watson | B29C 65/4835 |
| | | | 156/285 |
| 2013/0037981 A1 | 2/2013 | Tanaka et al. | |
| 2015/0328877 A1* | 11/2015 | Shome | B29C 66/91411 |
| | | | 156/64 |

FOREIGN PATENT DOCUMENTS

JP 2010287829 A 12/2010
JP 2014124683 A * 7/2014

* cited by examiner

DEVICE AND METHOD FOR PRODUCING A MOULDING OF SURFACE PROPERTIES

TECHNICAL FIELD

The invention relates to a device for producing a moulding of surface properties.

BACKGROUND

Various methods for examining surface properties are known. High-resolution images of a surface topography can be produced with suitable probes, or with particle or electromagnetic radiation. Furthermore, visualizations of surface properties such as, for example, a magnetization, an electrical charge distribution or a chemical composition or chemical properties can be generated. Some examination methods are non-destructive and do not affect the surface to be examined. Other methods of examination require a significant interaction with the surface to be examined and change its properties or structure.

Atomic force microscopy enables a non-destructive and high-resolution imaging of a topography of a surface. However, the surface examined with atomic force microscopy must be scanned in high-resolution with an elastically mounted measuring probe, which requires a long measuring time of usually several minutes per image. The surface intended for the surface analysis must be brought into the detection range of the measuring probe. Similar requirements and limitations regarding the surfaces that are suitable and sufficiently accessible for the analysis also apply to other optical or microscopic examination methods or to spectroscopic analyses.

Various methods for producing a moulding of a surface topography are known in practice for enabling the examination of hard-to-reach surface regions. A soft metal foil can be pressed onto the surface to be examined in order to mould the surface topography. The moulded soft metal foil can subsequently be analyzed, for example, with optical microscopes or with an atomic force microscope to produce images of the surface topography of the surface to be analyzed.

It is also known in practice to apply a curing material to a surface and to release a cast or impression from the surface after a curing process, wherein the moulding thus obtained forms a highly realistic negative shape of the surface topography. A long curing time is usually necessary when using curing materials composed of two components. It is also known in the art to arrange liquid polymer materials configured as film or foil onto the surface which can be activated, for example, by heat or radiation and cured by cross-linking to mould the surface topography.

The manual application of the curable polymer material onto the surface is labor-intensive and cost-intensive. In addition, such a moulding process can hardly be reproduced with sufficiently accuracy, so that, for example, comparative surface analyses that are performed at intervals over a longer period of time are not possible or can be performed only with considerable effort.

The currently available curable polymer materials regularly allow only a moulding of the surface topography, i.e., the three-dimensional structuring of the surface to be moulded. It would be advantageous if, in addition to the surface topography, other surface properties could also be imaged with a moulding and made available for subsequent measurements and analyses.

SUMMARY

It is therefore regarded as an object of the present invention to design a device for producing a moulding of a surface property in such a way that a moulding of a surface or a surface property can be performed with little effort as reliably and reproducibly as possible. In addition, it is desirable if additional characteristics for surface properties can already be determined during the production of the moulding, if required.

This object is achieved according to the invention with a device having a housing, with a displaceable pressure plunger which can be pressed onto the surface and is mounted on or in the housing, the pressure plunger having a blank carrier with a pressure surface that can be pressed onto the surface, on which a moulding blank having a moulding layer of a curable material is releasably fixable, and with a curing device arranged on or in the housing with which curing device the curable material of the moulding blank can be cured while being pressed onto the surface. With the device according to the invention, a prefabricated moulding blank can be pressed easily and reproducibly onto a surface to perform a moulding of a surface with a moulding layer of a curable material. In doing so, the moulding blank is provided as a consumable material for a single moulding of a surface, while the device of the invention can be reused and used to produce a large number of mouldings, each with new moulding blanks. The separately prepared moulding blank is suitably fixed on the blank carrier before the beginning of the moulding process, pressed onto the surface with the blank carrier and released again from the blank carrier after the curing of the curing material pressed onto the surface.

For example, either manually or by means of a spring force of a spring device, the displaceable pressure plunger can be pressed onto the surface to produce a contact pressure that is sufficient for the moulding and at the same time is not excessively high and that can be maintained evenly for the duration of curing of the curable material. A manual application or attachment of a moulding layer made of a curable material is not required. The production of a moulding is thereby simplified and also reproducible with higher accuracy for an untrained user. The contact pressure, for example, can be specified, depending on the curable material used, but also depending on the surface to be moulded and in particular its topography and wetting ability. The contact pressure can also be very low in individual applications and, if appropriate, bring about an almost zero-pressure contacting of the moulding blank with the surface.

By pressing the moulding layer onto the surface to be examined, the surface properties which are decisive for the subsequent measurement and evaluation, such as, for example, a topography of the surface, are transferred to the moulding layer and fixed by its curing. The curing process of the curable material can be expediently activated, for example, by a suitable supply of energy and performed and completed quickly after activation.

The moulding layer is expediently made of a suitable cross-linking polymer material which, during the pressing onto the surface to be moulded, takes on the properties relevant for the moulding such as, for example, a topography or even a magnetization or hydrophobicity of the surface and retains it during curing. In this way, in addition to scanning and imaging of the topography, further surface properties such as, for example, the magnetization or hydrophobicity of the surface can be moulded and preserved or made available for subsequent analyses.

By using a suitable material or combination of materials for the moulding layer, in addition to the surface topography, another surface property or even several other surface properties may be moulded and provided for subsequent analyses without spatial contact with the moulded surface. For example, electric, magnetic or electromagnetic fields prevailing in the region of the surface as well as temperature gradients or chemical properties are also considered as surface properties that can be moulded with the moulding.

It is also possible that a copy of the moulded surface is made from the moulding and this copy of the surface is used for subsequent measurements and analysis.

The housing is advantageously adapted for manual use and handling. The housing may, for example, be designed approximately cylindrical and easy to grasp with one hand or having a diameter of a few centimeters to about 10 or 15 centimeters. The housing may also have an almost arbitrarily different shape and be configured, for example, hemispherical or cuboid. The pressure plunger can be linearly displaceable or mounted pivotably about a pivot axis on or in the housing. The pressure plunger can be pressed onto the surface both manually and by means of a spring force applied by a spring device or, for example, electrically with an actuator.

Such a device can be used in various applications such as in the inspection of anilox rolls, in the quality assurance of production processes in the semiconductor industry, in process-related examinations such as thermal spraying or in the context of research and development in prototypes and analyses in order to be able to mould the surface to be examined as reliably and precisely as possible and to prepare for subsequent analysis procedures. The device should be as ergonomically shaped as possible and have a sufficiently robust mechanism in order to be able to carry out a large number of mouldings with high precision and reproducibility over a long period of use.

Using the device for producing a moulding makes it possible to examine surfaces which cannot be analyzed in a standardized manner by conventional means and methods. Thus, hard-to-reach surfaces such as an interior of an internal combustion engine or even uneven surface contours can be quickly and reliably moulded. The surface to be examined does not have to be brought into a measuring device. The surface must be accessible only for the duration of the moulding process, so that a surface of a production machine is required only for a short time for the moulding and costly downtime of the production machine can be minimized, since the time-consuming analysis of the surface can be performed on the moulding. Temporal changes of a surface can also be analyzed by several successively produced mouldings and the mouldings can be archived for subsequent examinations.

The blank carrier may consist of a dimensionally stable material or at least form a dimensionally stable pressure surface. It is also conceivable that the blank carrier has an elastic coating or an elastic pressure structure which forms the pressure surface, for example, to allow the most uniform possible contact pressure of the moulding blank onto the surface to be moulded. The blank carrier may also have an elastic or flexible membrane which can be hydraulically or pneumatically deflected to press the moulding blank in the direction of the surface to be moulded and pressed onto the surface in order to press the interposed moulding blank onto the surface. By generating and maintaining a hydraulic or pneumatic pressure force acting on the membrane, the contact pressure of the moulding blank can be specified precisely and evenly over a large area onto the surface.

In order to be able to better mould an inclined surface and to be able to adapt an adaptation of the moulding layer of the moulding blank to an inclined or not completely flat surface, it is provided that the blank carrier is pivotally mounted. In this way, an approximately equal contact pressure can be exerted by the pivotally mounted blank carrier on the moulding layer which is pressed onto the surface, even when the surfaces are not completely flat.

It is preferably provided that the blank carrier has at least two contact pressure segments which can be displaced relative to one another. Two contact pressure segments which can be displaced relative to one another can be realized, for example, by a stationary contact pressure segment and a second contact pressure segment which can be displaced. The blank carrier may also consist of, for example, four or seven rectangular or honeycomb-shaped contact pressure segments which are arranged side by side and form the pressure surface on which the moulding blank can be fixed and pressed onto the surface by a displacement of the pressure plunger. The individual contact pressure segments can each be mounted separately pivotable about a pivot axis or mounted pivotable in all directions with a ball joint. The pressure surface formed by the plurality of contact pressure segments can thereby be adapted to curved surfaces and possibly compensate for unevenness of the surface to be moulded. If the moulding blank is made flexible or elastic from the curable material before curing of the moulding layer, an individual adaptation of the moulding blank to an uneven surface can be made possible by a suitable design of a blank carrier divided into several contact pressure segments.

It is provided that the device has a positioning device for the displaceable pressure plunger in order to enable a moulding process as reproducible as possible and to ensure that unintentional displacement of the moulding layer relative to the surface is avoided during a moulding step and the resulting curing of the moulding layer while pressed onto the surface. For this purpose, the cylindrical or hemispherical housing may have an annular contact flange which can be placed concentrically around the surface region to be moulded on the surface and, for example, adhesively fixed in this position. In the case of a different housing shape, the profile of the contact flange may deviate and be adapted to the relevant housing shape. It is also possible that the housing comprises a plurality of shaped elements which are conically tapered to a tip and arranged along a housing surface surrounding the pressure surface of the blank carrier, each forming an approximately punctiform contact surface for the housing on the surface. The tips projecting towards the surface facilitate repeatable positioning and reliable fixing of the housing onto the surface to be moulded.

It is likewise possible for the housing to have one or more adhesive surfaces or suction devices or bores laterally adjacent to the pressure surface of the blank carrier in order to fix the housing onto the surface to be moulded with adhesion with negative pressure suction or with the aid of suitable fastening means such as screws or bolts.

An advantageous embodiment of the inventive concept is provided in that the device has a force measuring device with which a tensile force or compressive force exerted on the pressure plunger can be detected. The force measuring device may be, for example, a piezoelectric sensor detecting a forced deformation. It is also possible for the force measuring device to have a deformation element, the forced deformation of which caused by the application of force can be detected, for example, with strain gauges and be converted into an electrical measurement signal. The force measuring device can be configured such that the force measuring device can detect a compressive force, a tensile force, or both compressive forces and tensile forces that are applied during the pressing of the moulding blank or during the release of the cured moulding.

It is advantageously provided that the force measuring device is arranged on a guide rod of the pressure plunger. The force measuring device can be arranged directly adjacent to or in a transition region to the blank carrier in order to be able to detect as accurately as possible the pressing forces exerted on the blank carrier during the pressing of the pressure plunger on the blank carrier and via this on the moulding layer.

According to a particularly advantageous embodiment of the inventive concept, it is provided that the device has a deformation element mounted with a displacement device which can be pressed by an actuating device onto the surface in order to cause a deformation of the surface. The deformation element may be, for example, a pin, a cone or a tip, which plunges into the surface at a sufficiently high contact pressure and causes a deformation of the topography of the surface. The displacement device for displacing the deformation element can, for example, have a spring force device which can be actuated manually or automatically, which presses the deformation element onto the surface with a predefinable and optionally adjustable spring force. The displacement device may also have, for example, an electromotive, magnetic or hydraulic drive device which causes the displacement of the deformation element and in conjunction with a suitably designed force measuring device, produces an open or closed loop controllable contact pressure of the deformation element onto the surface. Surface deformations can be forced with the displaceable deformation element, the surface deformations being able to be detected from the moulding and evaluated after release of the moulding, for example, to obtain additional information about the hardness of an object in the region of the surface.

With regard to the smallest possible space requirement for the device equipped with a displaceable deformation element, it is provided according to the invention that the deformation element is displaceably mounted in the blank carrier between a pressing position protruding from the blank carrier over the pressure surface and a resting position retracted into the blank carrier, not protruding over the pressure surface. In his case, the deformation element can be stored within the blank carrier or above the blank carrier spaced from the surface in the resting position, without requiring any significant additional space. In order to deform the surface with the deformation element, the deformation element can be displaced out of the blank carrier and pressed via the pressure plunger into the surface. In this case, the moulding blank must either be fixed and pressed on the deformed surface only after the deformation of the surface and a subsequent withdrawal of the deformation element into its resting position on the blank carrier, or for example, be configured annular and surrounding the deformation element protruding from the blank carrier, the deformation element then also being pressed into the surface and causing the deformation of the surface during the curing of the moulding layer. In such an embodiment of the device, for example, the forced deformation of an elastic body can be detected with the moulding, which would reform or change again after removal of the deformation element.

The curable material of the moulding layer is advantageously selected and predetermined such that the curing process of the curable material can be activated in a suitable manner, or set in motion and quickly performed or completed. For this purpose, the curing device can generate a suitable activation energy or a curing energy assisting the curing process. Depending on the respective curable material, the curing device may generate heat or cold, for example, or generate a magnetic or electric field or even generate electromagnetic radiation with which the curing process can be activated or assisted. The curable material preferably has a low viscosity and surface energy to allow the most accurate possible moulding of the surface. The cured material should have a low adhesion and a sufficient elasticity to be able to be easily and non-destructively released from the surface after the curing process. Depending on the respective surface and the surface properties to be determined, the cured material may also be stiff and rigid or highly solidified.

According to an advantageous embodiment of the inventive idea, it is provided that the curing device has an illumination device with which electromagnetic radiation can be emitted.

Since a large number of cross-linking polymer materials with different properties are commercially available, which can be activated or cured with UV radiation and have already been developed in connection with other applications, it is advantageously provided that the illumination device emits LTV radiation. Suitable light-emitting diodes which can emit high-energy UV radiation are inexpensive and available with high luminosity. By using UV radiation for the activation and implementation of the curing process, a possibly undesirable heating of the surface, which is disadvantageous for the surface to be moulded, can be reduced and possibly even excluded as far as possible.

The curing device can be integrated into the blank carrier in an advantageous manner, in particular if it is an illumination device. Thus, the blank carrier may have a cavity in which the illumination device is arranged and which has a cover permeable to heat radiation or UV light on which the moulding blank can be arranged and fixed. The cover may be, for example, a transparent rigid plastic material or a flexible film.

In order to facilitate an attachment and reliable fixing of the moulding blank on the pressure plunger and to support a necessary release of the moulding blank with the cured moulding layer after the curing process, it is provided that the pressure surface of the blank carrier has an adhesive layer for releasably fixing the moulding blank. The adhesive layer can be formed, for example, by a coating with a suitable adhesive material. It is likewise possible that the pressure surface of the blank carrier and an outer side of the moulding blank provided for fixing to the blank carrier are each coated or covered with a hook and loop material.

The invention also relates to a moulding blank having a moulding layer of a curable material for use with the device described above. According to the invention, the moulding layer is arranged on a carrier layer with which the moulding blank can be fixed to a pressure surface of a blank carrier of the device and released again from the pressure surface after the curing of the curable material of the moulding layer. The carrier layer is used for mechanical stabilization and shaping support of the moulding layer. The curable material of the moulding layer therefore does not have to be resistant to deformation or sufficiently dimensionally stable in order to be able to be applied to and pressed onto the surface. It is also possible to use viscous and pasty curable materials which can be applied as a coating to the carrier layer and fixed together with the carrier layer on the blank carrier.

Furthermore, the curable material of the moulding layer need not have such a high strength that the moulding layer could be released from the surface without leaving any residues even without the carrier layer. Rather, it is only necessary that the moulding layer adhere sufficiently strongly to the carrier layer so that the moulding layer cannot inadvertently release from the carrier layer during the attachment of the moulding blank to the blank carrier and during the pressing of the moulding blank onto the surface. After the curing of the curable material, the moulding layer being correspondingly structured to the moulded surface usually forms a sufficiently mechanically stable and dimensionally stable moulding body which can either be released together with the carrier layer or independently of the carrier layer from the moulded surface and stored for subsequent examination, or be supplied to a suitable analysis device.

An advantageous embodiment of the inventive idea provides that in addition to the curable material, the moulding layer has a further material component with which, in addition to a surface topography, a further surface property can be moulded. Thus, with the additional material component, for example, a magnetic field prevailing on the surface can be detected and made visible or accessible for subsequent analyses. The additional material component could consist of iron filings or contain iron filings whose orientation is influenced and predetermined by the magnetic field in the region of the surface before curing and whose arrangement and orientation is fixed by the subsequent curing of the curable material and preserved for subsequent analyses.

It is provided that the carrier layer consists of a dimensionally stable material to facilitate the handling of the moulding blank. It is also possible for the carrier layer to consist of an elastic material so that it can be deformed during a pressing operation in conjunction with a blank carrier formed from a plurality of contact pressure segments and adapted to an uneven surface.

In particular, for use of the moulding blank with a device which has a displaceable deformation element, it is provided and advantageous according to the invention that the moulding blank has a recess which is surrounded by the moulding layer of the curable material. The moulding blank may, for example, be configured annular, such that the curable material of the moulding layer annularly surrounds a centrally arranged recess in the carrier layer. If necessary, the deformation element can be pressed through the central recess simultaneously with the moulding blank or beforehand onto the surface in order to deform the surface. Since the moulding blank surrounds the deformation element, the change in the topography of the surface produced by the deformation element can be detected from all sides respectively the contact surface of the surface with the deformation element can be detected. Various embodiments of the moulding blank are conceivable and, for example, it is also possible for the moulding blank to have only one recess laterally protruding into the moulding blank or a C-shaped or H-shaped base surface.

The invention also relates to a method for producing a moulding of a surface or a surface property. According to the invention, it is provided that in a pressing step, a moulding blank is fixed to a moulding layer made of a curable material on a pressure surface of a pressure plunger and is pressed with the pressure plunger onto the surface, that in a moulding step, the curable material is cured during pressing with a curing device, and that the moulding blank with the cured moulding of the surface is released from the pressure plunger in a removal step. By using a device described above, this method can also be performed by an untrained person simply, quickly and with sufficient precision to produce a reproducible moulding of a surface or a surface property.

According to an advantageous embodiment of the inventive concept, it is provided that the curable material of the moulding layer is a cross-linking polymer that can be activated with electromagnetic radiation and that in the moulding step, the cross-linking polymer is irradiated with electromagnetic radiation using an illumination device. Appropriately activatable cross-linking polymer materials are commercially available in different variants with different properties and can be used cost-effectively for implementing the process. It is also possible to use polymer materials modified or provided with additional components specifically for the production of a moulding, or other curing moulding materials.

Advantageously, it is provided that the curable material of the moulding layer is irradiated with UV radiation and thereby activated or cured. A sufficiently intense UV irradiation of the moulding layer can be produced with suitable light-emitting diodes in order to be able to perform and complete the curing process quickly. Such light-emitting diodes are available at low cost. The light-emitting diodes can be operated energy-efficiently and enable a power supply independent of a mains supply, which can be made available, for example, with a suitable accumulator device.

The light-emitting diodes or the curing device can be arranged laterally or concentrically surrounding the pressure plunger in the region of the blank carrier and can activate or accelerate curing of the moulding layer of the moulding blank by lateral action or stimulation acting through the blank carrier. It is also possible to integrate the curing device, individual components of the curing device, or, for example, one or more light-emitting diodes into the blank carrier of the pressure plunger or into another area of the pressure plunger.

According to an advantageous embodiment of the inventive concept, it is provided that a compressive force exerted on the pressure plunger is detected with a force measuring device during the pressing step. In this way, the contact pressure exerted on the pressure plunger can be determined and taken into account for subsequent evaluations of the moulding of the surface produced thereby. In addition, measurement results from several moulding procedures can be compared more easily and more meaningfully.

It is also possible to detect the contact pressure exerted on the pressure plunger with the force measuring device and to take it into account for a suitable open or closed loop control of the contact pressure. For example, a display can indicate when the contact pressure detected by the force measuring device is above or below a predetermined threshold value. In an automatically operable pressing device, with which the pressure plunger, for example, with electric motors or magnetically is subjected to a contact pressure and can be pressed onto the surface, a force measuring signal generated by the force measuring device can be used for the open or closed loop control of the pressing device.

According to the invention, it is also possible and advantageous for the determination of additional information that a tensile force is detected with a force measuring device, the tensile force being exerted on the moulding blank while the moulding blank is released with the cured moulding of the surface. The force required for releasing the moulding from the surface may depend, for example, on the respective curable material or polymer used, or on the three-dimensional surface structuring or other adhesive properties of the surface. By detecting the required tensile force that must be exerted on the pressure plunger to release the moulding, additional information on these surface properties can be obtained, which affect the tensile force required for release.

A particularly advantageous embodiment of the inventive idea provides that before or during the moulding step, a deformation element is pressed onto the surface and causes a deformation of the surface which is moulded from the moulding blank. The deformation element may be, for example, a pin, a cone or a point that is pressed into the surface, thereby changing the topography of the surface. This change in the topography is dependent on the shaping of the deformation element, on the contact pressure with which the deformation element is pressed into the surface, but also on the properties of the surface or object with this surface. When pressing the moulding blank, the moulding layer of the polymer material adapts to the changed topography of the surface, which is moulded after curing of the polymer material and thus can be detected and evaluated with subsequent examinations and measurements.

The deformation element can be pressed into the surface during the moulding step and exert a deformation force onto the surface for the duration of the curing of the polymer material. In this case, it is also possible to examine properties of the surface of a resilient or elastic material, the surface of which would change back after removal of the deformation element and, possibly, would assume its original shape and properties prior to the action of the deformation element.

The deformation element may also be pressed onto the surface before the moulding step and optionally even pressing step in order to produce a permanent deformation of the surface. In the subsequent moulding step, this deformation is transferred to the moulding and can then be examined and evaluated after release of the moulding from the deformed surface. For example, the hardness of an object can be determined in a region within the surface captured by the moulding with such a method.

It is also possible that the deformation element is not displaced perpendicular to the surface and pressed into the surface, but, with the deformation element, a force directed at an acute or obtuse angle to the surface is produced on the surface or on the object with the surface, which can lead to a characteristic change in the topography of the surface. In this way, for example, scratch marks can be generated for hardness determinations or examinations can be carried out on an artificially produced surface wear.

BRIEF DESCRIPTION OF THE DRAWINGS

Embodiments of the inventive concept are hereinafter explained in more detail, which are shown by way of example in the drawing. It shows.

DETAILED DESCRIPTION

Figure 1:
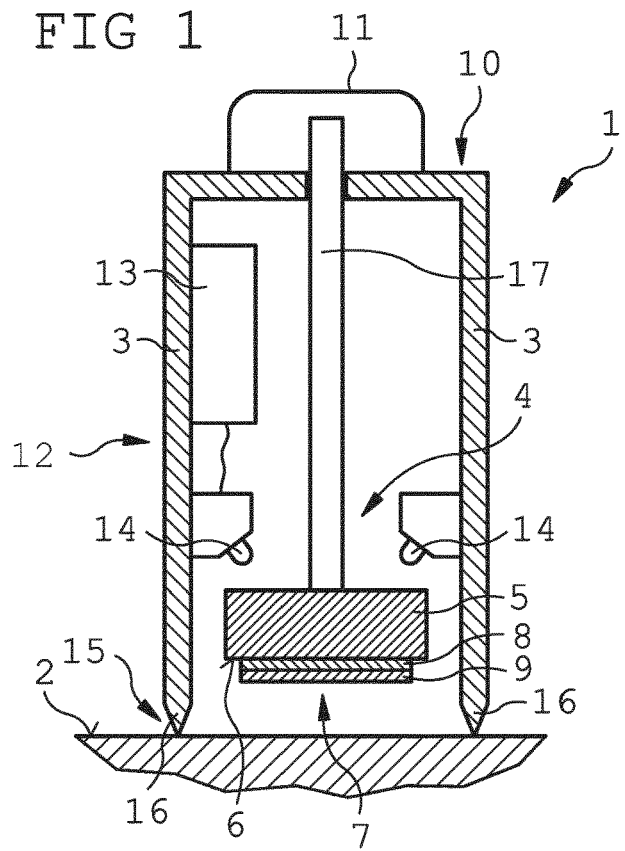
FIG. 1 is a schematic representation of a device according to the invention for producing a moulding with a moulding blank, wherein the moulding blank is fixed to a pressure plunger and the pressure plunger is still at a distance from the surface to be moulded.
Figure 2:
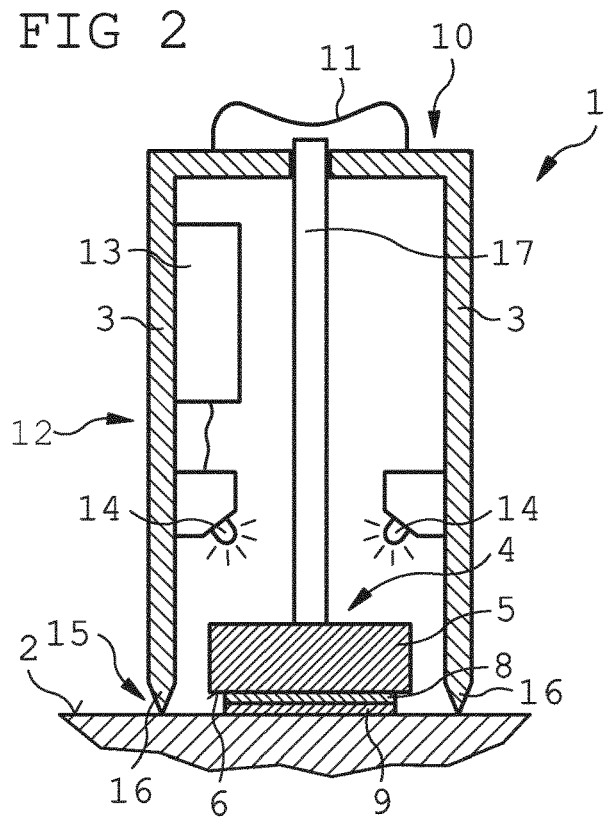
FIG. 2 is a schematic representation of the device shown in FIG. 1, wherein the pressure plunger is pressed onto the surface with the moulding blank fixed thereto.

FIGS. 1 and 2 each show a device 1 for producing a moulding, the device being set up on a surface 2 to be moulded. In a housing 3, a pressure plunger 4 is mounted displaceably in the direction of the surface 2 in a pressure plunger guide, the pressure plunger guide not being shown in detail.

Figure 5:
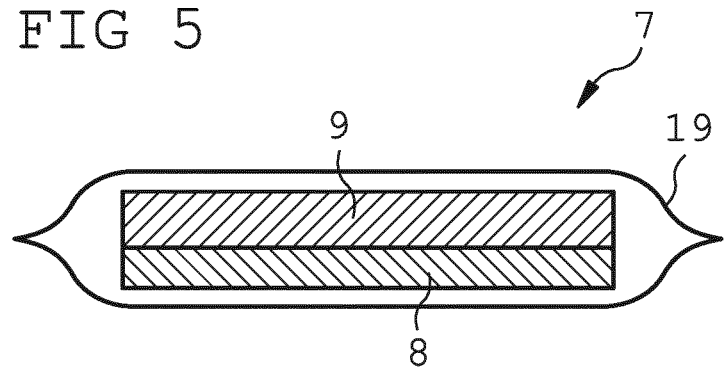
FIG. 5 is a schematic sectional view of a moulding blank located in a protective cover.

The pressure plunger 4 has, at its end facing the surface 2, a blank carrier 5, the upper side of which facing the surface 2 forms a pressure surface 6. On the pressure surface 6 of the blank carrier 5, a separately moulding blank 7 shown in FIG. 5 is releasably fixed by means of an adhesive layer. The moulding blank 7 has a dimensionally stable carrier layer 8 and applied thereto a moulding layer 9 made of a curable cross-linking polymer material.

The moulding layer 9 is initially not yet cured and has pasty properties. By pressing a push button 11 arranged on an end face 10 of the housing 3 and in operative connection with the pressure plunger 4, the pressure plunger 4 can be displaced from a set-up position shown in FIG. 1, in which the moulding blank 7 can be fixed to the pressure surface 6 of the blank carrier 5 and then the housing 3 can be positioned onto the surface 2, into a pressure position shown in FIG. 2, in which the pressure plunger 4 with the moulding blank 7 fixed thereon is pressed onto the surface 2.

A curing device 12 is arranged in the housing 3 of the device 1, the curing device being supplied and controlled by a control and power supply device 13 with electrical energy. The curing device 12 has a plurality of UV light-emitting diodes 14 arranged concentrically around the pressure plunger 4 on an inner wall of the housing 3. The UV light-emitting diodes 14 radiate UV light in the direction of the moulding blank 7 in the switched-on state. The UV light of the UV light-emitting diodes 14 activates and accelerates cross-linking and curing of the curable polymer material of the moulding layer 9 of the moulding blank 7.

When the pressure plunger 4 is pressed with the moulding blank 7 fastened thereto onto the surface to be moulded 2, the not yet cured moulding layer 9 deforms and forms a die, or a negative shape of the surface topography of the surface 2. The UV light-emitting diodes 14 can be switched on automatically with a displacement of the pressure plunger 4 onto the surface 2 or manually by a switching device not shown in detail in order to cure the moulding layer 9 adapted to the surface topography of the surface 2 and to permanently preserve the moulding produced thereby. In order to accelerate the curing process, the blank carrier 5 may consist of a UV-transparent material, so that the UV radiation emitted by the UV light-emitting diodes can illuminate the moulding blank 8 and the moulding layer 9.

In order to facilitate a positioning and fixing of the housing 3 onto the surface 2, the housing 3 has three conically tapered contact tips 16 spaced apart from one another at a lower edge of the housing 15. The contact tips 16 enable a tilt-free setup of the housing 3 onto the surface 2 and reduce the risk of undesired lateral displacement of the housing 3 on the surface 2.

Figure 3:
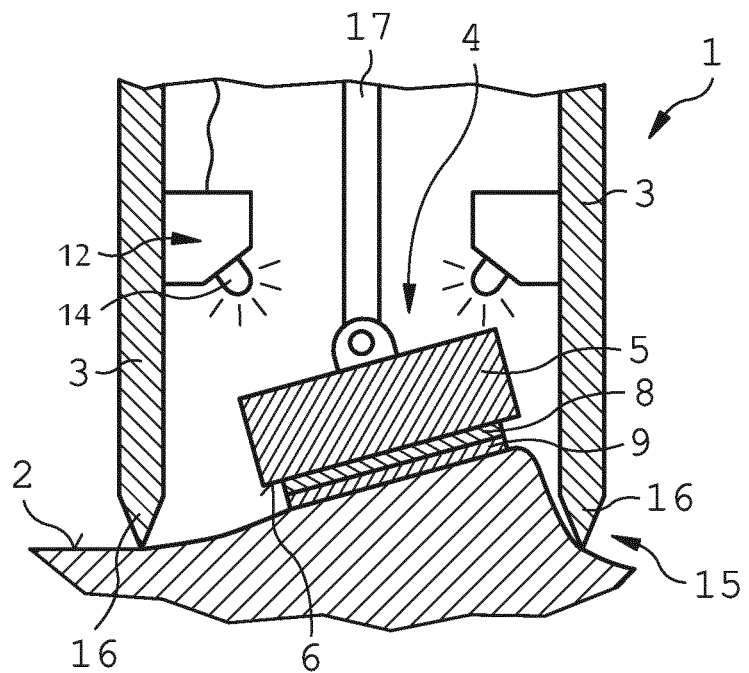
FIG. 3 is an enlarged schematic illustration of a portion of the device with a pivotally mounted blank carrier.
Figure 4:
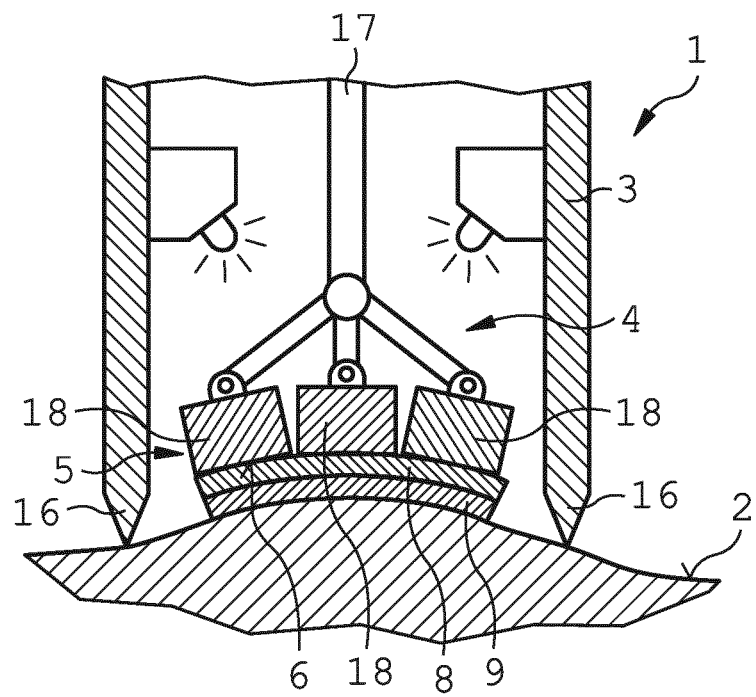
FIG. 4 is an illustration according to FIG. 3, wherein the blank carrier is configured differently and is formed from three contact pressure segments which can be displaced relative to each other.

FIG. 3 and FIG. 4 schematically show variants of the device 1 with a respectively differently configured pressure plunger 4. The blank carrier 5 is pivotally mounted on a linearly displaceable guide rod 17 of the pressure plunger 4 in the embodiment shown in FIG. 3. The orientation of the blank carrier 5 can thereby adapt in a simple manner to an uneven or sloping surface 2.

In the exemplary embodiment shown in FIG. 4, the blank carrier 5 has three contact pressure segments 18 each pivotally mounted independently of one another, which together form the pressure surface 6 of the pressure plunger 4, on which the moulding blank 7 can be fixed, in order to be pressed onto the surface 2 with the pressure plunger 4. By means of the contact pressure segments 18 which can be displaced relative to one another, the moulding layer 9 of the moulding blank 7 can also be adapted to a curved surface 2 or to an uneven surface 2 and be pressed with a substantially constant contact pressure.

The moulding blank 7 depicted separately and in an enlarged illustration in FIG. 5 consists of the dimensionally stable carrier layer 8 and the initially still pasty moulding layer 9 made of the cross-linking polymer material, which can be cured by LTV light. The moulding blank 7 is a consumable material and may be surrounded with a light-proof and in particular UV-proof envelope 19 or packaged therein for protection against curing of the molding layer 9 and against damage to the moulding blank 7 during its storage prior to its use.

Figure 6:
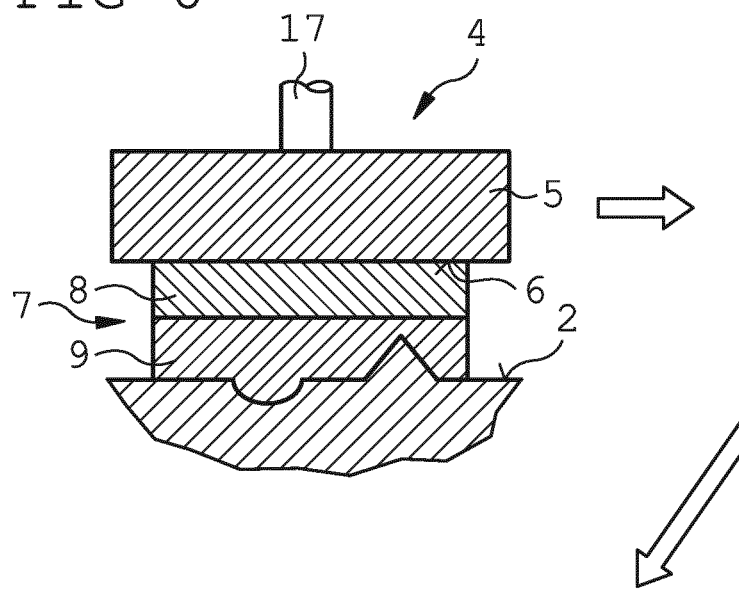
FIGS. 6 to 8 are a schematic representation of a plurality of method steps of a method sequence, in which a moulding of the surface is produced and subsequently analyzed with a scanning probe microscope.
Figure 7:
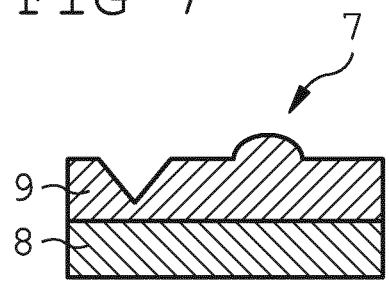
Figure 8:
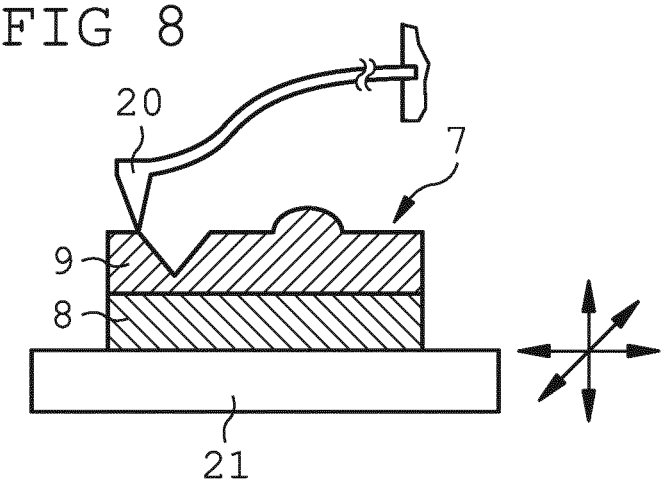

Individual process steps which may be carried out to perform a surface analysis using the method according to the invention are illustrated by way of example and schematically in FIGS. 6 to 8. In a pressing step shown in FIG. 6 the moulding blank 7 is pressed with the pressure plunger 4, or with the blank carrier 5 of the pressure plunger 4 with the device 1 onto the surface to be examined 2, so that the still deformable material of the moulding layer 9 of the moulding blank 7 adapts to the surface topography of the surface 2. In a moulding step the material of the moulding layer 9 is then cured by irradiation with UV light. After releasing the deformed and solidified moulding blank 7 from the surface 2 in a removal step and subsequently from the blank carrier 5, the deformed moulding layer 9 shown in FIG. 7 forms a die of the surface topography. Instead of or in addition to the surface topography, the material of the moulding layer 9 may also have been influenced by other properties of the surface 2 to be analyzed, such as, for example, its magnetic properties, its hydrophobicity or its chemical properties, so that by a subsequent analysis of the solidified moulding blank 7 these properties which have been transferred to or influenced the moulding blank 7 can be analyzed with suitable measuring methods and measuring devices. FIG. 8 shows, by way of example, the analysis of the surface topography with the aid of a probe 20 of a scanning probe microscope. For this purpose, the solidified moulding blank 7 forming the die can be arranged on a measuring table 21 of the scanning probe microscope, not shown in detail. Even spatially difficult to access surfaces 2 or time-varying surfaces 2, or surface properties can be analyzed by the moulding according to the invention with little effort, reliably and reproducibly.

Figure 9:
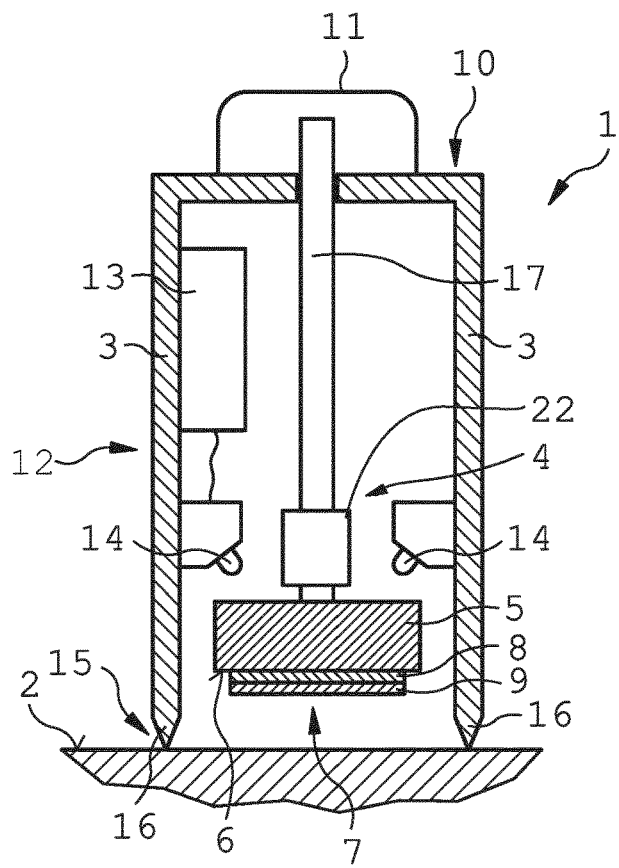
FIG. 9 is a schematic representation of a device according to the invention with a force measuring device.

In the exemplary embodiment of the device 1 shown in FIG. 9, a force measuring device 22 is arranged on the guide rod 17 proximal to the blank carrier 5. The force measuring device 22 may include, for example, a deformation-sensitive piezoelectric element or a strain gauge arrangement. The compressive force exerted on the moulding blank 7 can be detected during the pressing of the pressure plunger 4 onto the surface 2 using the force measuring device 22. In the same way, the tensile force can also be detected with the force measuring device 22, the tensile force being applied to release the cured moulding blank 7, thus the moulding produced from the surface 2.

The force measuring device 22 may be wired or wirelessly connected to an evaluation device, not shown. The measured signals detected by the force measuring device 22 can already be evaluated during the production of the moulding and be used, for example, to trigger an optical or acoustic display as soon as a sufficient contact pressure is reached, or if the contact pressure drops or varies excessively during the production of the moulding. The measurement signals generated by the force measuring device 22 can also be initially stored in the evaluation device and kept available for subsequent evaluation or processing of all information generated via the moulding.

Figure 10:
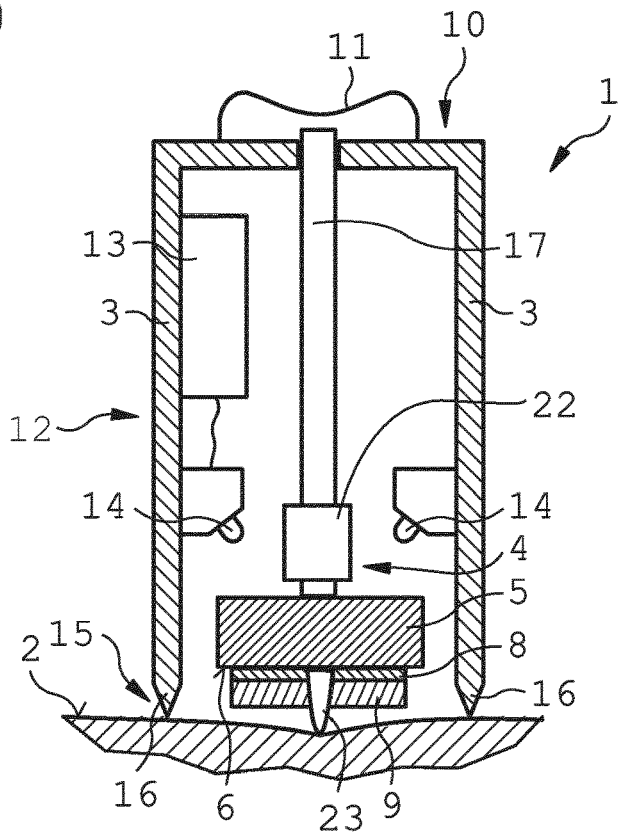
FIG. 10 is a schematic representation of a device according to the invention, which has a deformation element which can be displaced along the guide rod and which can be pressed centrally onto the surface through an annular moulding blank.

The exemplary embodiment of the device 1 shown in FIG. 10 has a conically tapering deformation element 23, which is displaceably mounted in the guide rod 17 or in the blank carrier 5. With an actuating device, not shown, a displacement device, also not shown separately, for example, actuates a spring device or an electric motor and the deformation element 23 can be pressed into the surface 2 to cause a change in the topography of the surface 2. The moulding blank 7 is annular and surrounds the deformation element 23 which is pressed through a central recess of the moulding blank 7 into the surface 2.

Figure 11:
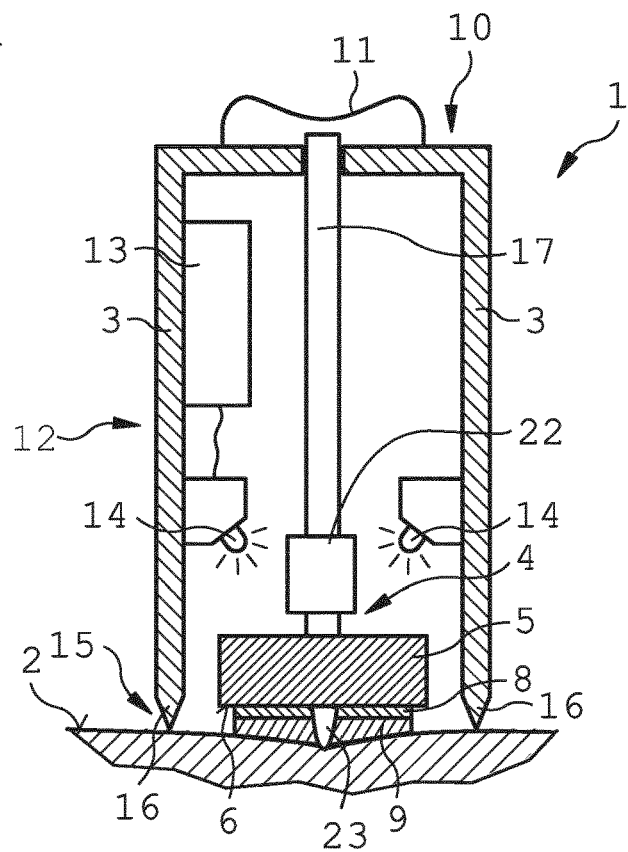
FIG. 11 is a schematic representation of the device shown in FIG. 10, wherein during the production of the moulding, the deformation element is pressed into the surface and deforms it.

A possible use of the device 1 during the production of the moulding is shown in FIG. 11. The deformation element 23 is pressed together with the moulding blank 7 onto the surface 2. As a result, for example, an alteration in the topography of the surface 2 that remains constant for the duration of the moulding can also be effected in an elastic material with a resilient surface 2, which can be detected with the moulding and subsequently evaluated.

Figure 12:
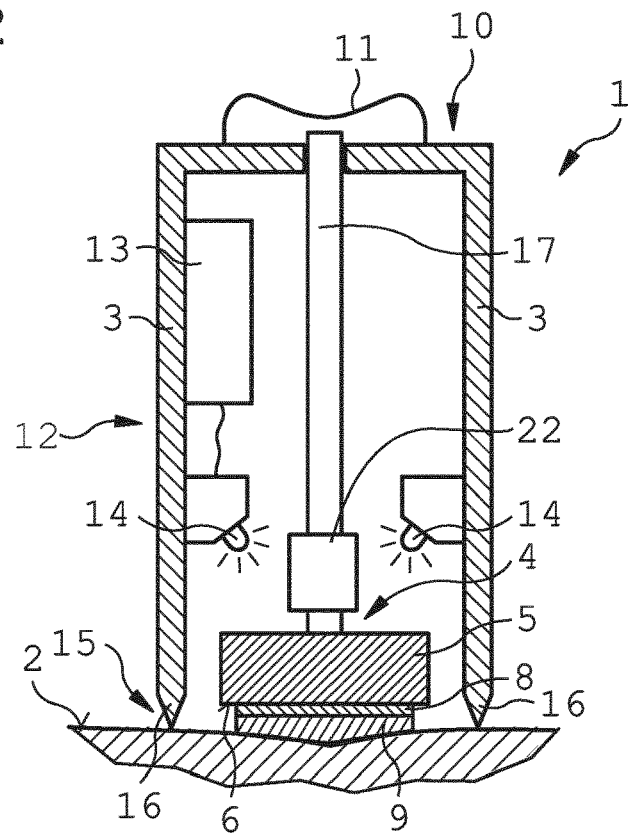
FIG. 12 is a schematic representation of the device shown in FIGS. 10 and 11, wherein the deformation element was pressed into the surface and caused a permanent deformation of the surface before the production of the moulding, and the deformation element is retracted into the blank carrier during the production of the moulding.

It is also possible to first produce a permanent change in the topography of the surface 2 with the deformation element 23 and then to again retract the deformation element 23 back into the blank carrier 5 before subsequently pressing the pressure plunger 4 with the moulding blank 7 against the previously modified surface 2 in order to create the moulding. In the embodiment illustrated in FIG. 12, the production of a moulding after a preceding deformation of the surface 2 with the deformation element 23 is shown by way of example.

The invention claimed is:

1. A device (1) for producing a moulding of a surface property for subsequent analysis, comprising:
   a housing (3) that is adapted for manual use and handling;
   a displaceable pressure plunger (4) that is mounted on or in the housing (3) and can be pressed onto a surface (2), the pressure plunger (4) having
      a blank carrier (5) with a pressure surface (6) that can be pressed onto the surface (2), on which pressure surface (6) releasably fixable is
      a moulding blank (7) with a moulding layer (9) made of curable material; and
   a curing device (12) arranged on or in the housing (3), with which curing device (12) the curable material of the moulding blank (7) can be cured while being pressed onto the surface (2),
   wherein the housing contacts the surface (2) while the pressure plunger (4) is pressed onto the surface (2).

2. The device (1) according to claim 1, wherein the blank carrier (5) is pivotally mounted.

3. The device (1) according to claim 1, wherein the blank carrier (5) has at least two contact pressure segments (18) displaceable relative to each other.

4. The device (1) according to claim 1, wherein the device (1) has a positioning device for the displaceable pressure plunger (4).

5. The device (1) according to claim 1, wherein the device (1) has a force-measuring device (22) with which a tensile force or compressive force exerted on the pressure plunger can be detected.

6. The device (1) according to claim 5, wherein the force-measuring device (22) is arranged on a guide rod (17) of the pressure plunger (4).

7. The device (1) according to claim 1, wherein the device has a deformation element (23) mounted with a displacement device, wherein the deformation element can be pressed by an actuating device onto the surface (2) to cause a deformation of the surface (2).

8. The device (1) according to claim 7, wherein the deformation element (23) is mounted displaceably in the blank carrier (5) between a pressing position projecting from the blank carrier (5) over the pressure surface (6) and a resting position retracted into the blank carrier (5), not projecting over the pressure surface (6).

9. The device (1) according to claim 1, wherein the curing device (12) has an illumination device with electromagnetic radiation.

10. The device (1) according to claim 9, wherein the illumination device emits UV-radiation.

11. The device (1) according to claim 1, wherein the pressure surface (6) of the blank carrier (5) has an adhesive layer for releasably fixing the moulding blank (7).

* * * * *